July 11, 1933.    R. S. SANFORD    1,917,951
BRAKE
Original Filed Aug. 15, 1922    2 Sheets-Sheet 1
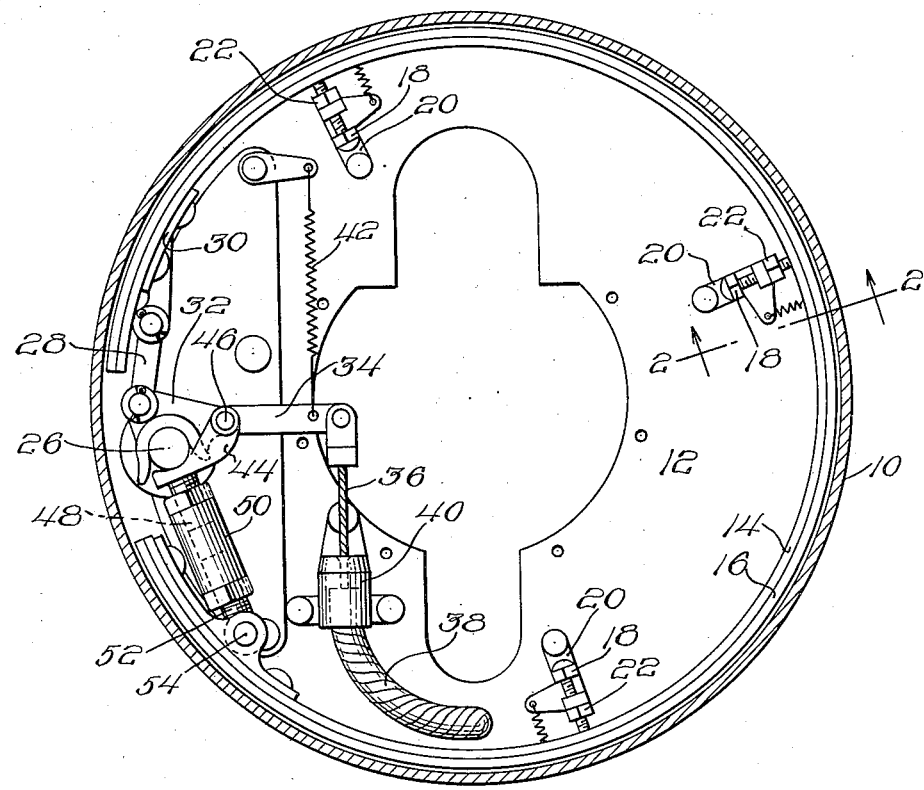
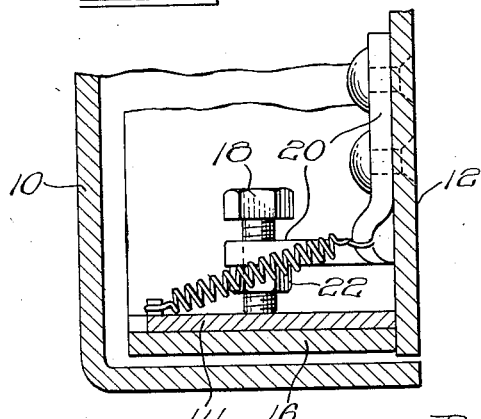
INVENTOR.
Roy S. Sanford
BY
ATTORNEYS.

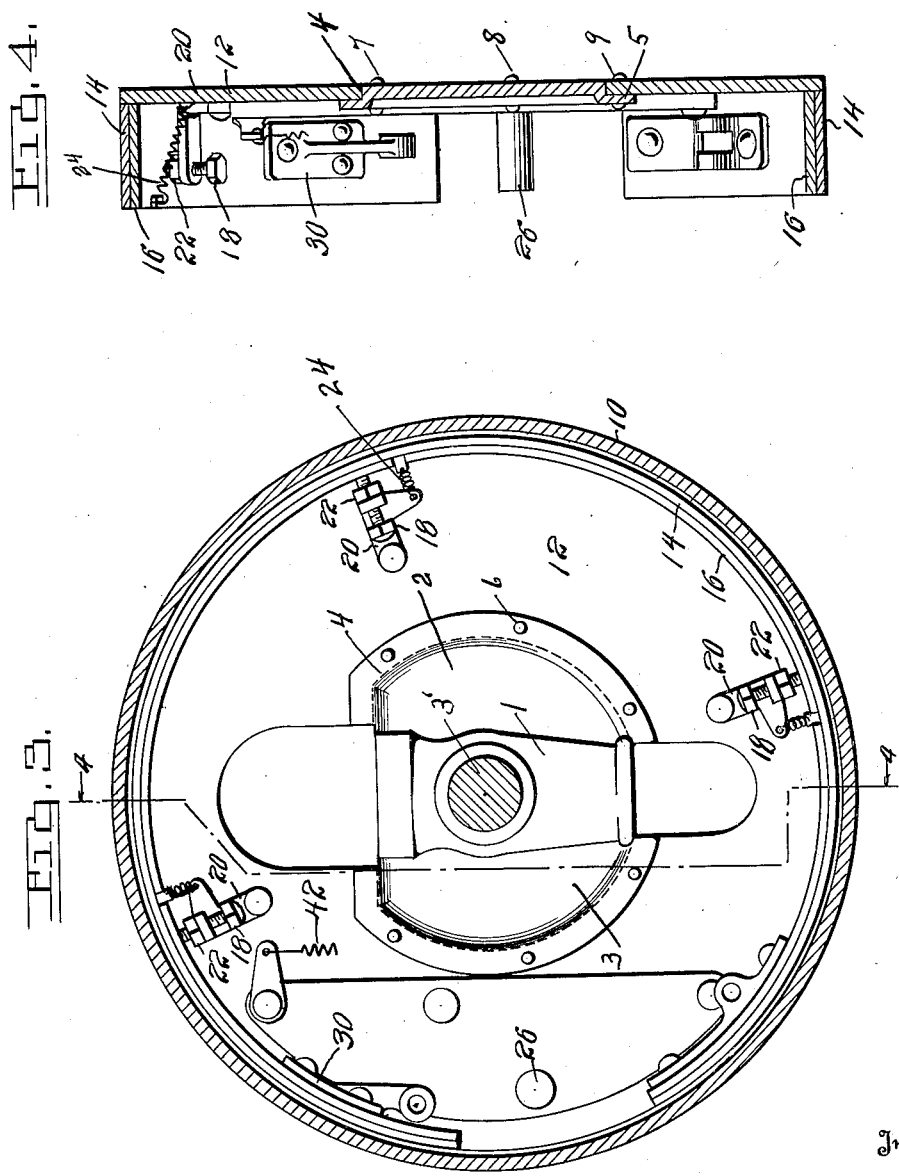

Patented July 11, 1933

1,917,951

UNITED STATES PATENT OFFICE

ROY S. SANFORD, OF SOUTH BEND, INDIANA, ASSIGNOR TO BENDIX BRAKE COMPANY, OF SOUTH BEND, INDIANA, A CORPORATION OF ILLINOIS

BRAKE

Original application filed August 15, 1922, Serial No. 581,945. Divided and this application filed April 16, 1928. Serial No. 270,195.

This invention relates to brakes, and is illustrated as embodied in an internal expanding automobile brake of the type in which the friction means anchors at one end when the drum is turning in one direction and at the other end when the drum is turning in the other direction. An object of the invention is to improve the operating and anchoring means of the brake, and to facilitate its adjustment.

Preferably the brake includes operating means which is arranged to prevent any shifting of the anchorage of the brake during its application, by forcing a portion of the friction means against the rotating drum before either of the anchoring parts leaves its anchored position. Thus the drum friction holds one or the other of these parts in anchored position while the applying means completes the application of the brake.

Another important feature of the invention relates to a novel linkage for applying the brake, and to novel means through which the brake anchors and which is preferably acted on by the applying linkage, and which includes an adjustment such as a threaded device which can be manipulated to vary the effective length of the friction means to adjust its clearance with respect to the drum. The particular adjustment shown embodies substantial novelty in its threaded connection, whether or not it forms part of the anchorage or applying means.

Other objects and features of the invention, including a novel positioning device for the friction means, and other desirable details of construction, will be apparent from the following description of the illustrative embodiment shown in the accompanying drawings, in which:

Figure 1 is a vertical section through the brake, just inside the head of the brake drum, and showing the brake friction means in side elevation; and Figure 2 is a partial radial section on the line 2—2 of Figure 1, showing one of the novel positioning devices for the brake friction means.

Fig. 3 is a vertical section through a brake showing the mounting of the backing plate on the spindle.

Fig. 4 is a section taken on line 4—4 of Fig. 3.

As shown in the drawings, the brake device is adapted for mounting on an automotive vehicle wheel and is illustrated as associated with a front or swivelled wheel. As shown, the front wheel spindle 1 is provided with an integral flange having the similar sections 2 and 3 disposed on opposite sides. The radius of each of the sections is greater than the distance from the center of the stub shaft 3' to the upper or lower end of the knuckle. Each flange section is formed with a peripheral shoulder 4 and a marginal lip 5, as shown in Fig. 4. At points spaced along the periphery the lip 5 is formed with the apertures 6. Through these apertures extend the securing means such as bolts or rivets 7, 8 and 9. These members serve to attach the backing plate on the spindle.

In the illustrated embodiment of the invention, the brake includes a rotatable drum 10, at the open side of which is a support such as a backing plate 12, and within which is the friction means of the brake, preferably a floating device such as an expansible flexible band 14 provided on its friction face, in the form shown, with friction lining 16 riveted or otherwise secured thereto.

The idle position of band 14, with the brake released, is determined by novel stops such as setscrews 18 engaging the inner face of the band and adjustably threaded through stationary members or brackets 20 secured to the backing plate 12 by rivets or the like. Lock nuts 22 may be provided for setscrews 18 if desired. If preferred, setscrews 18 may be loose in brackets 20, their positions being determined by engagement of nuts 22 with the brackets 20. Inclined springs 24 urge the friction band against the backing plate 12 and also against the stops 18. Springs 24 are attached at their opposite ends to band 14 and to the bracket 20.

At one side of the drum, there is provided anchoring means for the brake, preferably in the form of at least one fixed abutment or anchor 26, one such abutment being shown between the ends of the band. The illustrated anchor is a cylindrical post mounted in any desired manner and preferably carried by the backing plate 12.

The friction means is provided, according to one very important feature of the invention, with a novel floating linkage, which may be arranged to apply the brake as well as to transmit the braking torque to the anchor. This linkage is shown as including a pair of rigid and non-adjustable links or members 28 pivoted to a fitting 30 at one end of the friction means, and pivoted at their lower ends to a generally triangular thrust member 32 cylindrically recessed on its lower face to fit over anchor 26 and extended to form a lever 34 disconnectedly engaging and fulcruming on anchor 26. Lever 34 has its inner end connected to operating means such as a flexible tension member or cable 36 passing through a Bowden conduit 38 secured at its end by a fitting 40 to backing plate 12. Lever 34 acts against a return spring 42.

The lower end of the friction means is controlled by a pivoted linkage including a wedge-shaped member 44 connected by a pivot 46 to lever 34, and disconnectedly engaging the lower side of anchor 26, and which has a threaded stem 48 forming part of an adjustably threaded connection extending circumferentially or lengthwise of the friction means and which is operable to vary the effective circumferential length of the friction means to adjust its clearance with respect to the drum, and to compensate for wear. This threaded connection is shown as a turn-buckle including a central member 50 threaded on stem 48 and also threaded on a member 52 pivoted at 54 to the lower end of the friction means.

It will be seen that this provides a simple adjustment through which the friction means anchors when the drum is turning in one direction, and through which the applying linkage acts, so that changes in adjustment do not affect either the anchorage or the application of the brake.

It will also be noted, as an important effect of the described arrangement, that in applying the brake, or at least during the preliminary stage of applying the brake, both ends of the friction means remain anchored, so that the drum friction will hold one or the other of the ends in anchored position while the operation of applying the brake is being completed. This is because lever 34 turns on anchor 26, and member 44 slides or wedges on anchor 26, until at least the ends of the friction means engage the drum, whereupon the drum friction holds either part 32 of lever 34, or else the wedge member 44, anchored while the operation of applying the brake is completed. During the final application of the brake, ordinarily either part 44 or part 34 will draw slightly away from the anchor, although if desired this may be obviated by careful adjustment.

It will be seen, further, that the braking torque has some tendency to react on the brake-applying connections, through part 32 or wedge 44 as the case may be, so that in case of grabbing the braking torque will force a reduction in brake-applying pressure which at least partially cancels the excessive braking action.

While one illustrative embodiment has been described in detail, it is not my intention to limit the scope of the invention to that particular embodiment, or otherwise than by the terms of the appended claims. The present application, as to all subject-matter claimed, is a division of my prior application No. 581,945, filed August 15, 1922, issued May 1, 1928, as Patent No. 1,668,338.

I claim:

1. A brake comprising, in combination, a drum, a fixed anchor member at one side of the drum, a floating expansible friction member within the drum having the fixed anchor arranged between its ends and members pivoted respectively to said ends and anchoring against said member in opposite directions of drum rotation and operable to apply the brake.

2. A brake comprising, in combination, a drum, a floating expansible friction member within the drum and members pivoted respectively to the opposite ends of said member and one of which anchors when the drum is turning in one direction and the other of which anchors when the drum is turning in the other direction, together with an operating member pivoted to said members and acting on the ends of the friction member through the pivoted members.

3. A brake comprising, in combination, a rotatable drum, a fixed anchor abutment at one side of the drum, a floating friction device within the drum having at one end a non-adjustable part anchoring on said abutment when the drum is turning in one direction, and a device at the other end of the friction device anchoring against the abutment when the drum is turning in the other direction and which includes threaded means adjustable to vary the effective circumferential length of the friction device to adjust its clearance with respect to the drum, together with a flexible operator transmitting brake-applying force to said part and said device.

4. A brake comprising, in combination, friction means, and pivotally-connected members through which the friction means anchors and which also serve as a linkage for applying the brake.

5. A brake comprising, in combination, a rotatable drum, a floating friction device engageable with the drum and having one part which anchors when the drum is turning in one direction and having a different part which anchors when the drum is turning in the other direction, and applying means acting to force a portion of the friction means against the drum while both of said parts remain anchored and which then forces one of said parts away from anchored position to complete the application of the brake while the drum friction holds the other of said parts anchored.

6. A brake comprising, in combination, a rotatable drum, a floating friction device engageable with the drum and anchoring at one end when the drum is turning in one direction and anchoring at the other end when the drum is turning in the other direction, and applying means acting to force a portion of the friction means against the drum while both of said ends remain anchored and which then forces one of said ends away from anchored position to complete the application of the brake while the drum friction holds the other of said ends anchored.

7. A brake comprising, in combination, a rotatable drum, a floating friction device engageable with the drum and having one part which anchors when the drum is turning in one direction and having a different part which anchors when the drum is turning in the other direction, and applying means acting to force at least one of the ends of the friction means against the drum while both of said parts remain anchored and which then forces one of said parts away from anchored position to complete the application of the brake while the drum friction holds the other of said parts anchored.

8. A brake comprising, in combination, a rotatable drum, a floating friction device engageable with the drum and anchoring at one end when the drum is turning in one direction and anchoring at the other end when the drum is turning in the other direction, and applying means acting to force at least one of the ends of the friction means against the drum while both of said ends remain anchored and which then forces one of said ends away from anchored position to complete the application of the brake while the drum friction holds the other of said ends anchored.

9. A brake comprising, in combination, friction means, a fixed abutment adjacent one end of the friction means, and a lever pivoted to the friction means and having a disconnected fulcrum engagement with said abutment and which is operable to apply the brake, and the fulcrumed portion of which is capable of swinging away from said abutment.

10. A brake comprising, in combination, friction means, a fixed member adjacent one end of the friction means, and a lever pivoted to the friction means and fulcrumed on said member and which is operable to apply the brake, together with means adjustable to vary the distance between the friction means and said member.

11. In a brake comprising a drum adapted to be secured to a ground wheel and a plate adapted to be secured to a spindle casting, a pair of levers pivotally mounted relatively to said plate and connected to a brake band and mechanically interconnected by means comprising lever arms of unequal length.

12. In a brake system, an interior band brake comprising a pair of levers interconnected, the operating arm of a first lever being movable by a flexible element terminating within a brake drum.

13. In a brake system, an interior band brake comprising a pair of levers interconnected, the operating arm of a first lever being movable by a flexible element terminating within a brake drum, said flexible element being mechanically connected with a similar element extending from another brake of like construction.

14. In an interior band brake, a pair of interconnected levers one of which is provided with resilient returning means.

15. In an interior band brake, band-expanding means connected to the opposite ends of a brake band and adapted to move said ends in opposite directions, the more powerful movement being imparted to that end moving in opposition to a torque produced by the engagement of an advancing wheel upon which said brake may be mounted.

16. In a brake construction, a spindle casting, a dust plate, dust plate supports integral and on opposite sides of said casting, and removable means for securing the dust plates to said supports.

17. Brake mechanism comprising, in combination, a rotatable drum, a backing plate at the open side of the drum cooperating with the drum to form a brake chamber, a friction band arranged in said chamber and expansible to be urged into engagement with the drum, pivotally connected linkage pivotally connected to opposite ends of the band and operable to be spread to expand the band into engagement with the drum and including a lever part within said chamber and swinging in a plane paralleling the backing plate, said band supported to float to anchor at one end when the drum is rotating in one direction and at the other end when the drum is rotating in the opposite direction, said pivotally connected linkage supported to float with the band, a flexible conduit connected at its end to the backing plate, and a tension connection extending through the conduit directly into said chamber and having its end paralleling the backing plate and coupled with said lever part inside the chamber to actuate it to expand the band into engagement with the drum and flexible to permit of the floating of the linkage with the band.

18. Self energizing brake mechanism comprising, in combination, a rotatable drum, expansible friction means arranged therein and having thrust links pivoted to its ends, said band supported to float and adapted to anchor at one end when the drum is rotating in one direction and at the other end when the drum is rotating in the other direction, and a floating angularly movable lever pivoted to said thrust links and operable to force them apart to apply the brake.

19. Brake mechanism comprising, in combination, a rotatable drum, expansible friction means arranged within the drum having separable ends and being adapted to anchor at one end when the drum is rotating in one direction and at the other end when the drum is rotating in the other direction, floating pivotally connected members pivoted to the separable ends of the friction means to expand the same into engagement with the drum, a flexible tension connection extending into the drum and connected with the pivotally connected members to actuate them to expand the friction means into engagement with the drum, said friction means and pivotally connected members adapted to float to permit anchorage of the friction means at either end to maximum efficiency of engagement thereof with the drum, and a backing plate at the open side of the drum and forming with the drum a substantially closed space housing the friction means and said members and through which the tension connection passes and a flexible conduit through which the tension connection extends and which conduit extends through the backing plate and has its end secured to the inner face of the backing plate.

In testimony whereof, I have hereunto signed my name.

ROY S. SANFORD.